(12) United States Patent
Maher et al.

(10) Patent No.: US 6,721,894 B2
(45) Date of Patent: *Apr. 13, 2004

(54) METHOD FOR CONTROLLING POWER OF A MICROPROCESSOR BY ASSERTING AND DE-ASSERTING A CONTROL SIGNAL IN RESPONSE CONDITIONS ASSOCIATED WITH THE MICROPROCESSOR ENTERING AND EXITING LOW POWER STATE RESPECTIVELY

(75) Inventors: Robert Maher, Carrollton, TX (US); Raul A. Garibay, Jr., Plano, TX (US); Margaret R. Herubin, Coppell, TX (US); Mark Bluhm, Carrollton, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,615

(22) Filed: Aug. 9, 2002

(65) Prior Publication Data

US 2003/0084355 A1 May 1, 2003

Related U.S. Application Data

(62) Division of application No. 09/779,150, filed on Feb. 8, 2001.

(51) Int. Cl.[7] .................................................. G06F 1/26
(52) U.S. Cl. .................................. 713/323; 713/310
(58) Field of Search .............................. 713/300, 310, 713/320, 323, 324, 340

(56) References Cited

U.S. PATENT DOCUMENTS 3,678,463 A 7/1972 Peters 4,204,249 A 5/1980 Dye et al.
4,267,577 A 5/1981 Hashimoto et al.

(List continued on next page.)

FOREIGN PATENT DOCUMENTS

| EP | 0 167 853 | 6/1984 |
|---|---|---|
| EP | 0172344 | 2/1986 |
| EP | 0 201 020 | 4/1986 |

(List continued on next page.)

OTHER PUBLICATIONS

Intel, "386 DX Microprocessor Programmer's Reference Manual" 1990, pp. 4–6 and 8–4.
Design and Electronik, "186–Processors with Low Current Drain Modules," vol. 23, Nov. 5, 1991, p. 8.
European Search Report dated Jul. 28, 1993, for E/93302399.
Intel, "Intel 82347 Power Management PC Peripheral,", Oct. 1990, pp. 1–55–1–80.
Intel, 386 SL Microprocessor SuperSet, 386 SL Microprocessor System Design Guide 1990, Introduction to the SL Superset, Chapter 1, pp. 1–1 through 1–3, System and Power Management, Chapter 14, pp. 14–1 through 14–23, Sep. 1990.

Primary Examiner—Thomas Lee
Assistant Examiner—Thuan Du
(74) Attorney, Agent, or Firm—Vedder, Price, Kaufman & Kammholz, P.C.

(57) ABSTRACT

In accordance with the presently claimed invention, power consumption reduction control is provided to a processor used to execute instructions for data processing. A power management control signal is provided to the processor in accordance with conditions associated with the processor being operated in normal and reduced power consumption modes of operation, and an acknowledgement signal indicative of such reduced power consumption mode of operation is returned in correspondence with the power management control signal.

42 Claims, 3 Drawing Sheets

U.S. PATENT DOCUMENTS

| | | | |
|---|---|---|---|
| 4,293,927 A | 10/1981 | Hoshii |
| 4,312,035 A | 1/1982 | Greene |
| 4,316,247 A | 2/1982 | Iwamoto |
| 4,317,180 A | 2/1982 | Lies |
| 4,317,181 A | 2/1982 | Teza et al. |
| 4,381,552 A | 4/1983 | Nocilini et al. |
| 4,395,756 A | 7/1983 | Daniels |
| 4,409,665 A | 10/1983 | Tubbs |
| 4,417,320 A | 11/1983 | Ei |
| 4,481,581 A | 11/1984 | Johnson |
| 4,545,030 A | 10/1985 | Kitchin |
| 4,570,219 A | 2/1986 | Shibukawa et al. |
| 4,573,117 A | 2/1986 | Boney |
| 4,590,553 A | 5/1986 | Noda |
| 4,615,005 A | 9/1986 | Maejima et al. |
| 4,616,335 A | 10/1986 | Howe, Jr. et al. |
| 4,653,018 A | 3/1987 | Stadlmeier et al. |
| 4,698,748 A | 10/1987 | Juzswik et al. |
| 4,720,811 A | 1/1988 | Yamaguchi et al. |
| 4,748,559 A | 5/1988 | Smith et al. |
| 4,758,945 A | 7/1988 | Remedi |
| 4,766,567 A | 8/1988 | Kato |
| 4,780,843 A | 10/1988 | Tietjen |
| 4,796,235 A | 1/1989 | Sparks et al. |
| 4,825,407 A | 4/1989 | Loessel et al. |
| 4,835,728 A | 5/1989 | Si et al. |
| 4,835,737 A | 5/1989 | Herrig et al. |
| 4,841,440 A | 6/1989 | Yonezu et al. |
| 4,851,987 A | 7/1989 | Day |
| 4,893,271 A | 1/1990 | Davis et al. |
| 4,907,150 A | 3/1990 | Arroyo et al. |
| 4,980,836 A | 12/1990 | Carter et al. |
| 5,021,950 A | 6/1991 | Nishikawa |
| 5,021,983 A | 6/1991 | Nguyen et al. |
| 5,025,387 A | 6/1991 | Frane |
| 5,036,493 A | 7/1991 | Nielsen |
| 5,070,450 A | 12/1991 | Holman, Jr. et al. |
| 5,083,266 A | 1/1992 | Watanabe |
| 5,086,387 A | 2/1992 | Arroyo et al. |
| 5,142,684 A | 8/1992 | Perry et al. |
| 5,167,024 A | 11/1992 | Smith et al. |
| 5,175,853 A | 12/1992 | Kardach et al. |
| 5,189,647 A | 2/1993 | Suzuki et al. |
| 5,203,003 A | 4/1993 | Donner |
| 5,218,704 A | 6/1993 | Watts, Jr. |
| 5,222,239 A | 6/1993 | Rosch |
| 5,237,699 A | 8/1993 | Little et al. |
| 5,241,680 A | 8/1993 | Cole et al. |
| 5,247,655 A | 9/1993 | Khan et al. |
| 5,276,889 A | 1/1994 | Shiraishi et al. |
| 5,291,542 A | 3/1994 | Kivari et al. |
| 5,339,446 A | 8/1994 | Yamasaki et al. |
| 5,355,503 A | 10/1994 | Soffel et al. |
| 5,361,364 A | 11/1994 | Nagashige et al. |
| 5,361,392 A | 11/1994 | Fourcroy et al. |
| 5,369,771 A | 11/1994 | Gettel |
| 5,388,265 A | 2/1995 | Volk |
| 5,390,350 A | 2/1995 | Chung et al. |
| 5,392,441 A | 2/1995 | Brasher et al. |
| 5,396,635 A | 3/1995 | Fung |
| 5,404,546 A | 4/1995 | Stewart |
| 5,410,711 A | 4/1995 | Stewart |
| 5,410,713 A | 4/1995 | White et al. |
| 5,418,969 A | 5/1995 | Matsuzaki et al. |
| 5,428,790 A | 6/1995 | Harper et al. |
| 5,432,946 A | 7/1995 | Allard et al. |
| 5,452,401 A | 9/1995 | Lin |
| 5,457,790 A | 10/1995 | Iwamura et al. |
| 5,457,801 A | 10/1995 | Aihara |
| 5,461,266 A | 10/1995 | Koreeda et al. |
| 5,475,848 A | 12/1995 | Ikeda |
| 5,481,731 A | 1/1996 | Conary et al. |
| 5,487,181 A | 1/1996 | Dailey et al. |
| 5,528,790 A | 6/1996 | Curran |
| 5,546,591 A | 8/1996 | Wurzburg et al. |
| 5,548,765 A | 8/1996 | Tsunoda et al. |
| 5,560,017 A | 9/1996 | Barrett et al. |
| 5,560,020 A | 9/1996 | Nakatani et al. |
| 5,560,024 A | 9/1996 | Harper et al. |
| 5,625,826 A | 4/1997 | Atkinson |
| 5,630,107 A | 5/1997 | Carmean et al. |
| 5,630,143 A | 5/1997 | Maher et al. |
| 5,630,146 A | 5/1997 | Conary et al. |
| 5,632,037 A | 5/1997 | Maher et al. |
| 5,637,932 A | 6/1997 | Koreeda et al. |
| 5,657,483 A | 8/1997 | Kardach et al. |
| 5,842,029 A | 11/1998 | Conary et al. |
| 5,935,253 A | 8/1999 | Conary et al. |
| 6,006,336 A | 12/1999 | Watts, Jr. et al. |
| 6,029,249 A | 2/2000 | Atkinson |
| 6,088,807 A | 7/2000 | Maher et al. |
| 6,173,409 B1 | 1/2001 | Watts, Jr. et al. |
| 6,223,293 B1 | 4/2001 | Foster et al. |
| 6,233,691 B1 | 5/2001 | Atkinson |
| 6,243,820 B1 | 6/2001 | Rosch |
| 6,311,287 B1 | 10/2001 | Dischler et al. |
| 6,343,363 B1 | 1/2002 | Maher et al. |
| 6,397,340 B2 | 5/2002 | Watts, Jr. et al. |
| 2001/0001880 A1 | 5/2001 | Watts, Jr. |

FOREIGN PATENT DOCUMENTS

| | | |
|---|---|---|
| EP | 0 242 010 | 1/1987 |
| EP | 0229692 | 7/1987 |
| EP | 0 349 726 | 5/1989 |
| EP | 0 363 567 | 6/1989 |
| EP | 0 358 423 | 9/1989 |
| EP | 0 426 410 A2 | 10/1989 |
| EP | 0 385 567 | 1/1990 |
| EP | 0368144 | 5/1990 |
| EP | 0 451 661 A2 | 3/1991 |
| GB | 2 010 551 | 12/1977 |
| GB | 2 130 765 | 11/1982 |
| GB | 2127999 | 4/1986 |
| JP | SHO 55 -47549 | 9/1978 |
| JP | HEI 3 -116210 | 10/1981 |
| JP | SHO 58 -205226 | 5/1982 |
| JP | 58-182736 | 10/1983 |
| JP | SHO 59-167752 | 10/1983 |
| WO | WO 92/10032 | 11/1990 |
| WO | WO 92/21081 | 11/1992 |

METHOD FOR CONTROLLING POWER OF A MICROPROCESSOR BY ASSERTING AND DE-ASSERTING A CONTROL SIGNAL IN RESPONSE CONDITIONS ASSOCIATED WITH THE MICROPROCESSOR ENTERING AND EXITING LOW POWER STATE RESPECTIVELY

This is a divisional of application Ser. No. 09/779,150, filed Feb. 8, 2001.

TECHNICAL FIELD OF THE INVENTION

This invention relates in general to integrated circuits, and more particularly to a microprocessor having hardware controlled power management.

BACKGROUND OF THE INVENTION

Increasingly, electronic circuit manufacturers need to reduce the power consumption of their boards. The conservation of power is particularly important in portable electronic devices, such as laptop or notebook computers, where the product is specifically designed for use in situations where power outlets are not available. Since laptop and notebook computers must operate using internal batteries or rechargeable battery packs for extended periods of time, the conservation of battery power becomes a primary concern.

In a laptop or notebook computer, the largest consumer of power is the display. The proportion of power consumed by the display will vary depending on the technology used. Thus, laptop and notebook computer manufacturers have disabled the power to the display during periods of inactivity. Decoupling the display from the power supply can be accomplished with fairly simple circuitry.

The next largest consumer of power on a laptop or notebook computer is the CPU motherboard microprocessor. Heretofore, computer manufacturers have used one or two techniques for reducing power consumption of the microprocessor during periods of inactivity. One technique reduces the speed of the system clock to a fraction of the normal operating frequency during periods of inactivity. Since the power consumption of the microprocessor is proportional to the frequency, reducing the frequency of the system clock also reduces the power consumption of the microprocessor. In an Intel 80386DX microprocessor (manufactured by Intel Corporation of Santa Clara, Calif.), reducing the operating frequency from 33 MHz to 4 MHz reduces the typical operating current of the microprocessor from 400 to approximately 100 milliamps. Nevertheless, an operating current of 100 milliamps still poses a large power drain on the battery.

A second technique for reducing power turns off the system clock during periods of inactivity. Turning off the system clock affects all circuitry on the motherboard. Consequently, the circuitry which disables the system clock must also save all pertinent information in the microprocessor and associated board logic and restore the data upon resumption of activity such that the state of the computer after resumption of the system clock will be identical to the state of the computer prior to disabling the system clock. As a result, this technique for consuming power is both costly because of the complicated circuitry and slow because of the need to store and restore the state of the computer.

Therefore, a need has arisen in the industry to provide a method and apparatus for conserving power in an electronic device which significantly reduces the power drain of the microprocessor without the need for complicated external circuitry.

SUMMARY OF THE INVENTION

In accordance with the presently claimed invention, power consumption reduction control is provided to a processor used to execute instructions for data processing. A power management control signal is provided to the processor in accordance with conditions associated with the processor being operated in normal and reduced power consumption modes of operation, and an acknowledgement signal indicative of such reduced power consumption mode of operation is returned in correspondence with the power management control signal.

In accordance with one embodiment of the presently claimed invention, a method for externally controlling a processor used to execute instructions for data processing, including:

providing directly to the processor a low-power-mode control signal by
asserting the low-power-mode control signal in response to a detection of one or more conditions associated with having the processor enter a low power operational mode, and
de-asserting the low-power-mode control signal in response to a detection of another one or more conditions associated with having the processor exit the low power operational mode; and
receiving an acknowledgement signal from the processor subsequent to the assertion of the low-power-mode control signal.

In accordance with another embodiment of the presently claimed invention, a method for externally controlling a processor used to execute instructions for data processing, including:

providing directly to the processor a power consumption control signal by
asserting the power consumption control signal in response to a detection of one or more conditions associated with initiation of a power consumption reduction procedure, and
de-asserting the power consumption control signal in response to a detection of another one or more conditions associated with termination of the power consumption reduction procedure; and
receiving an acknowledgement signal from the processor subsequent to the assertion of the power consumption control signal.

In accordance with another embodiment of the presently claimed invention, a method for externally controlling a processor used to execute instructions for data processing, including:

providing directly to the processor a low-power-mode control signal which includes first and second values by
maintaining the first value in response to a detection of one or more conditions associated with having the processor enter a low power operational mode, and
maintaining the second value in response to a detection of another one or more conditions associated with having the processor exit the low power operational mode; and
receiving an acknowledgement signal from the processor subsequent to an attainment of the first low-power-mode control signal value.

In accordance with another embodiment of the presently claimed invention, a method for externally controlling a processor used to execute instructions for data processing, including:

providing directly to the processor a power consumption control signal which includes first and second values by maintaining the first value in response to a detection of one or more conditions associated with initiation of a power consumption reduction procedure, and maintaining the second value in response to a detection of another one or more conditions associated with termination of the power consumption reduction procedure; and receiving an acknowledgement signal from the processor subsequent to an attainment of the first power consumption control signal value.

In accordance with another embodiment of the presently claimed invention, a method for externally controlling a processor used to execute instructions for data processing, including:

providing directly to the processor a low-power-mode control signal by asserting the low-power-mode control signal in response to a detection of one or more conditions associated with having the processor enter a low power operational mode, and de-asserting the low-power-mode control signal in response to a detection of another one or more conditions associated with having the processor exit the low power operational mode;

receiving an acknowledgement signal from the processor subsequent to the assertion of the low-power-mode control signal; and providing to the processor a clock signal which is independent of the low-power-mode control signal.

In accordance with another embodiment of the presently claimed invention, a method for externally controlling a processor used to execute instructions for data processing, including:

providing directly to the processor a power consumption control signal by asserting the power consumption control signal in response to a detection of one or more conditions associated with initiation of a power consumption reduction procedure, and de-asserting the power consumption control signal in response to a detection of another one or more conditions associated with termination of the power consumption reduction procedure;

receiving an acknowledgement signal from the processor subsequent to the assertion of the power consumption control signal; and providing to the processor a clock signal which is independent of the power consumption control signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
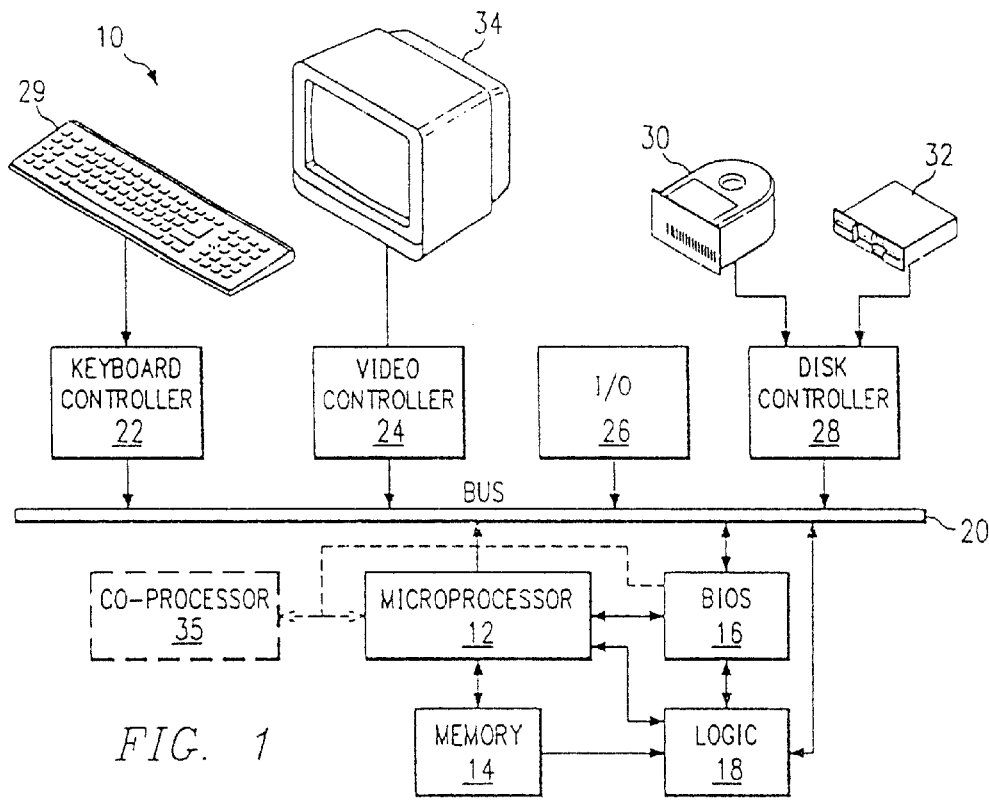
FIG. 1 illustrates a block diagram of a computer system.

FIG. 1 illustrates a block diagram of a computer system. The computer system 10 comprises a microprocessor 12 coupled to a memory subsystem 14, BIOS ROM 16 and logic 18 (commonly referred to as the "chipset"). Microprocessor 12 is coupled to bus 20. Bus 20 is used to communicate with a number of devices, shown in FIG. 1 as keyboard controller 22 video controller 24, I/O circuitry 26 and disk controller 28. Keyboard controller 22 is coupled to keyboard 29. Disk controller 28 is coupled to hard disk 30 and floppy disk 32. Video controller 24 is coupled to display 34. An optional coprocessor 35 is coupled to microprocessor 12 and BIOS 16.

The computer system 10 shown in FIG. 1 is a general-purpose architecture common to personal computers such as the IBM Personal Computer and compatibles. The BIOS 16 (basic input/output system) is typically a read-only memory which contains a set of programs for performing the basic control and supervision operations for the computer system 10. The BIOS 16 acts as an interface between the computer circuitry and the application software being executed by the CPU 12. Importantly, for power consumption purposes, the BIOS 16 and logic 18 monitor the circuitry to determine whether power consumption reduction procedures may be invoked. For example, the BIOS 16 and/or logic 18 may monitor the display 34 to determine whether its output has changed over a predetermined time period. If not, the BIOS 16 may invoke procedures to disable power to the display 34 (assuming computer system 10 is a portable computer) to conserve energy. Further, BIOS 16 monitors microprocessor 12 to determine whether the microprocessor can be idled without affecting operation of the computer system 10. For example, the microprocessor 12 may be executing a routine to wait for a character from the keyboard. In this case, the operation of the microprocessor can be suspended until a key is pressed.

Figure 2:
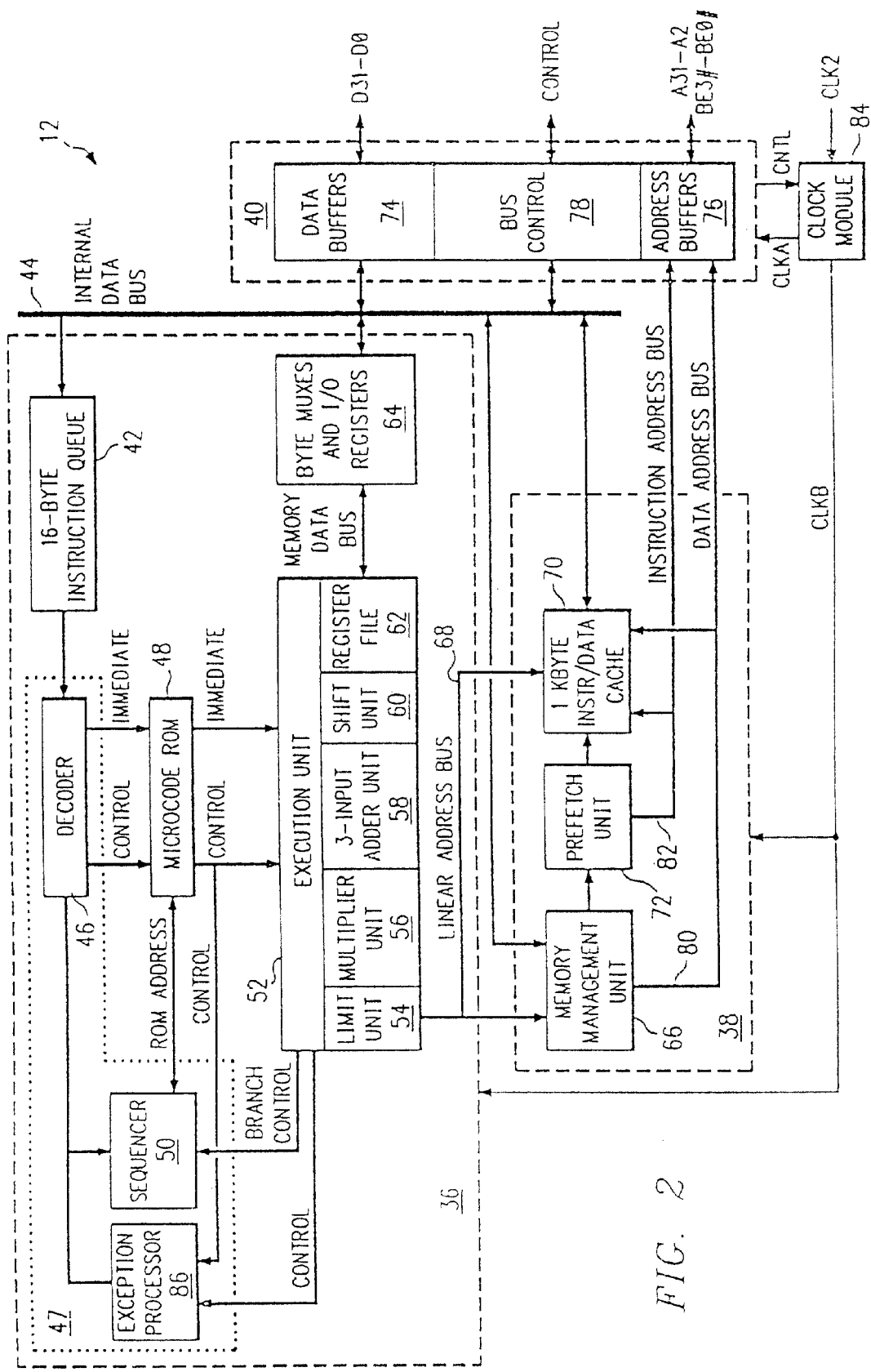
FIG. 2 illustrates a block diagram of the preferred embodiment of a microprocessor used in the computer system of FIG. 1.

FIG. 2 illustrates a detailed block diagram of the various subcircuits of a preferred embodiment of the microprocessor 12. For purposes of illustration, the microprocessor 12 will be described in connection with a microprocessor which is pin-compatible and instruction-compatible with the 80×86 family of processors by Intel Corporation, specifically the 80386 microprocessor although the invention could be used in other processors as well. The microprocessor 12 comprises three main functional groups: the core circuitry 36, the memory circuitry 38 and the bus controller 40. The core circuitry 36 includes an instruction queue 42 coupled to an internal data bus 44. The output of the instruction queue 42 is coupled to a decoder 46 of the decode/sequence circuitry 47. The decode/sequence circuitry 47 also includes a sequencer 50 and an exception processor 86. The decoder 46 is coupled to a microcode ROM 48, exception processor 86 and sequencer 50. The sequencer 50 is also coupled to the microcode ROM 48 and to an execution unit 52. The execution unit includes a limit unit 54, a multiplier unit 56, an adder unit 58, a shift unit 60, and a register file 62. The execution unit 52 is coupled to the microcode ROM 48 and to multiplexer and I/O register circuitry 64. The memory circuitry 38 comprises a memory management unit 66 coupled to a linear address bus 68 which is also connected to the execution unit 52 and an instruction/data cache memory 70. Memory management unit 66 is further coupled to the internal data bus 44. A prefetch unit 72 is coupled between the memory management unit 66 and the cache 70. Bus controller 40 includes data buffers 74, address buffers 76 and control circuitry 78. The data buffers 74 are coupled to the data I/O pins D31–D0, the address buffers 76 are coupled to the address pins A31–A2 and BE3#–BE0#. A data address bus 80 couples the memory management unit 66, the cache 70 and the address buffer 76. An instruction address bus 82 couples the prefetch unit 72, cache 70 and address buffer 76. The data buffers 74 are coupled to the internal data bus 44.

Clock module 84 receives an external clock signal (CLK2) and generates CLKA (connected to the bus controller 40) and CLKB (coupled to the memory circuitry 38 and the core circuitry 36). CLKA and CLKB are both clock signals of one-half the frequency of CLK2. Clock module 84 receives control signals from bus controller 40.

In operation, instructions are received by the microprocessor 12 from external memory under control of the memory management unit 66. For enhanced performance, an instruction/data cache 70 caches instruction and data received through the bus controller 40. Instructions are stored in the instruction queue and are subsequently translated by the decode circuitry 46 into microcode. The sequencer points to the next address in the microcode ROM 48 under control of the decoder 46 and the execution unit 52. The execution unit 52 processes information under control of the microcode ROM 48.

In the preferred embodiment, the microprocessor 12 has a static design, i.e., retention of data in the internal memories and registers of the microprocessor 12 is not dependent upon the clock signal. As described in greater detail hereinbelow, the clock module 84, under control of the bus controller 40, can disable clocks to the subcircuits of the core circuitry 36 and the memory circuitry 38 while continuing to generate clock signals to the bus controller 40. Thus, during periods of inactivity, a large portion of the circuitry of the microprocessor may be suspended, thereby greatly reducing the power consumed by the microprocessor 12.

Figure 3:
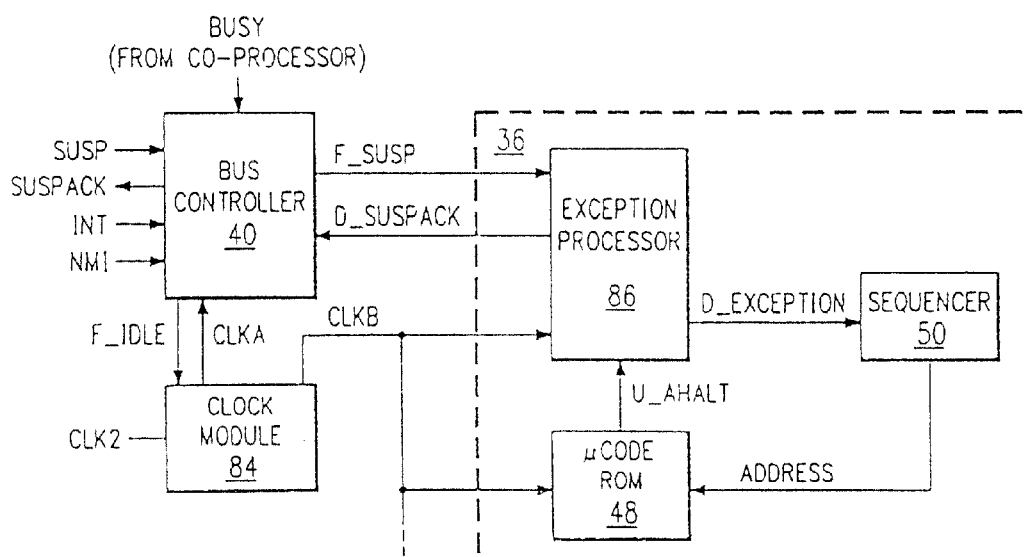
FIG. 3 illustrates a detailed block diagram of portions of the microprocessor of FIG. 2 related to the power management circuitry.
Figure 4:
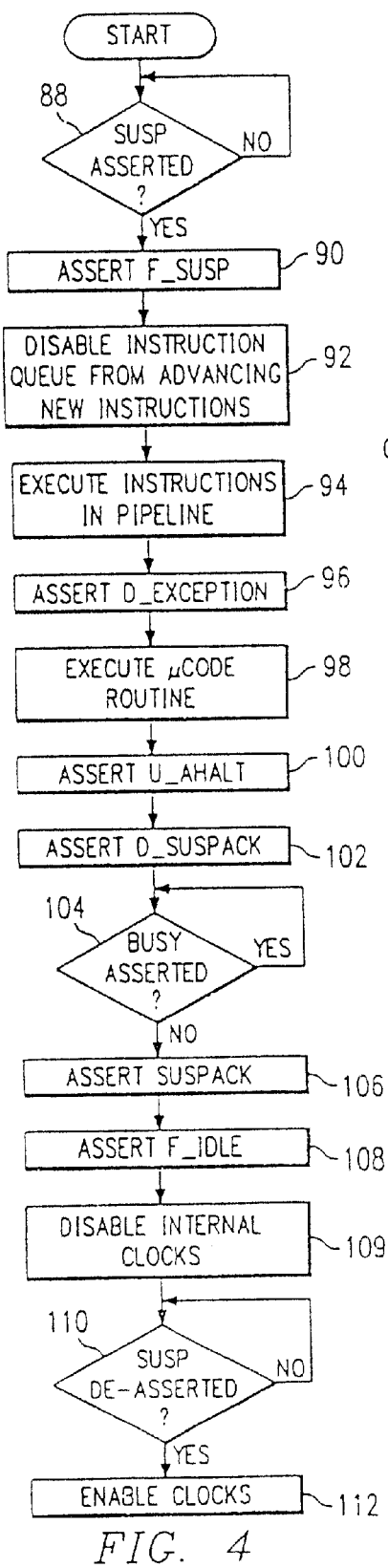
FIG. 4 illustrates a flow chart describing a preferred embodiment of operation for reducing microprocessor power consumption; e

FIGS. 3 and 4 describe the power reduction circuitry in greater detail. FIG. 3 is a block diagram showing control signals between various portions of the microprocessor. The bus controller 40 controls signals from external pins of the microprocessor 12. A suspend e (SUSP) signal is input to the bus controller 40 and a suspend acknowledge (SUSPACK) is output from the bus controller 40. A busy (BUSY) is received by the bus controller 40 from the coprocessor 35. The bus e controller 40 also receives a maskable interrupt (INTR) and a non-maskable interrupt (NMI). The bus controller 40 outputs an interrupt (or "exception") F_SUSP to the exception processor 86 and receives a control signal D_SUSPACK. The exception processor 86 also monitors the microcode ROM 48, bus controller 40 and execution unit 52 to determine whether instructions are being executed. The exception processor 86 outputs a signal D_EXCEPTION to the sequencer 50 and receives a control signal U_AHALT from the microcode ROM 48. The bus controller 40 outputs a control signal F_IDLE to the clock module 84.

In operation, an external circuit (typically the BIOS 16 in conjunction with the logic 18) detects conditions where microprocessor operations could be suspended. Upon detection of such a situation, the external circuit asserts the SUSP pin (for example, by driving the SUSP pin with a logical low voltage). In response to the assertion of the SUSP signal, the bus controller 40, in conjunction with the exception processor 86, asserts the F_IDLE control signal to the clock module 84. In response to the assertion of the F_IDLE signal, the clock module 84 disables the CLKB clock signals (by holding the disabled clock signal at a logical high or logical low voltage), while continuing to generating the CLKA clock signals. Since the design of the microprocessor is static, the memories do not require refreshing, and therefore suspending the clock will not result in a loss of data within the microprocessor 12. The SUSPACK signal is asserted to notify external circuitry that the microprocessor 12 is in the suspended state. To resume operation of the microprocessor 12, the SUSP signal is de-asserted (i.e., by applying a logical low voltage to the SUSP pin).

By suspending the clocks to the core circuitry 36 and memory circuitry 38, a significant reduction in the power consumed by the microprocessor 12 is realized. The bus controller 40 remains active to observe and control I/O signals between the microprocessor 12 and the external circuitry.

FIG. 4 illustrates a flow chart showing a more detailed operation of the suspend mode. In decision block 88, a loop is formed waiting for the SUSP signal to be asserted. In block 90, after the SUSP signal is asserted, the bus controller 40 asserts the F_SUSP signal, which is coupled to the exception processor 86. In block 92, in response to the assertion of the F_SUSP signal, the instruction queue 42 is prevented from advancing new instructions. In block 94, the decoder 46 ceases to advance new instructions to the microcode ROM 48 and any instructions currently being processed by the microcode ROM 48 or execution unit 52 (collectively, the "pipeline") are completed, including any activity by the bus controller 40 related to the instructions in the pipeline. After all instructions in the pipeline have been executed, the control signal D_EXCEPTION is asserted by the exception processor 86 in block 96. D_EXCEPTION is received by the sequencer 50 which initiates a power-down microcode routine (block 98) responsive to D_EXCEPTION. The power-down microcode routine prepares the microprocessor for suspend mode. In block 100, the microcode ROM 48 asserts the control signal U_AHALT to the exception processor 86. In response to receiving U_AHALT, the exception processor 86 asserts D_SUSPACK to the bus controller 40 in block 102. In decision 104, the bus controller 40, after receiving D_SUSPACK from the exception processor, checks the busy signal received from the coprocessor. So long as the busy signal from the coprocessor is asserted, the SUSPACK signal to the external circuitry will not be asserted and CLKB will not be disabled. Once, the busy signal is de-asserted by the coprocessor, the SUSPACK signal is asserted by the bus controller 40 to alert the external circuitry that the microprocessor 12 is in a suspended state and that the coprocessor is not currently performing any calculations, and may also be suspended. In block 108, F_IDLE is asserted by the bus controller 40 to the clock module 84. In response to the assertion of the F_IDLE signal, the clock module 84 disables the CLKB in block 109, thereby suspending operation of the core circuitry 36 and memory circuitry 38. The bus controller 40 then waits until the SUSP signal is de-asserted in decision block 110. Upon de-assertion of the SUSP signal, CLKB is resumed.

Most microprocessors, including the 80386, do not use all available pins on the chip package. Thus, the SUSP and SUSPACK signals may be communicated to and from the microprocessor 12 using unused pins, thereby maintaining compatibility with a pre-existing technology. Nonetheless, in the preferred embodiment, the pins for the SUSP and SUSPACK signals may be selectively enabled or disabled. In the preferred embodiment, the SUSP and SUSPACK pins are initially disabled, and the BIOS 16 must be configured to enable the pins in its start-up routine. To effect enabling or disabling of the SUSP and SUSPACK a pins, a control bit is provided which may be written to or read from via preselected I/O ports. The preferred embodiment of this aspect is shown in greater detail in connection with FIGS. 5a–b.

Figure 5A:
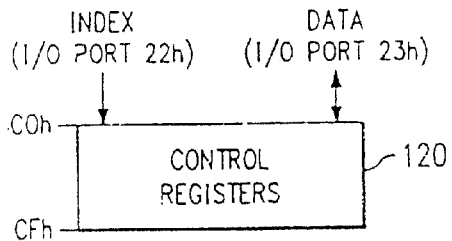
FIGS. 5a–b illustrate circuitry for enabling and disabling pins providing power management control signals.

In FIG. 5a, a plurality of control registers are accessible using INDEX and DATA signals input to the control registers 120. The majority of the registers (and bits thereof) are used for configuring the cache memory subsystem. For example, the control registers may be used to define non-cacheable regions of the main memory 14, to select the cache method (direct-mapped or set associative), and to enable flushing of the cache memory 70 via an external pin. Each control register is accessible by writing the address (referred to herein as the INDEX) of the register to an I/O port, shown in FIG. 5a as I/O port 22h. Another I/O port, shown herein as I/O port 23h, is used to read or write data from the specified control register. In the preferred embodiment, each I/O port 23h operation is preceded by an I/O port 22h operation, otherwise the second and later I/O port 23h operation would be directed off-chip. In the illustrated embodiment of FIG. 5a, the control registers each have an index between C0h and CFh.

Figure 5B:
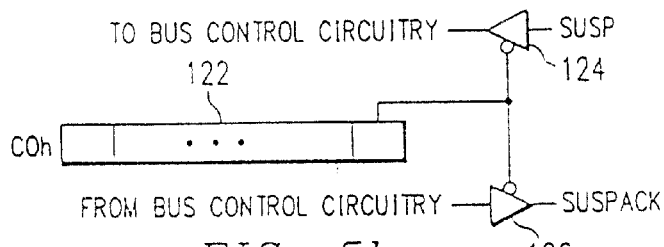

In FIG. 5b, the register having an index of C0h uses its least significant bit to control tri-state devices 124 and 126. A bit equal to a logical high (i.e., a logical "1") enables both tri-state devices 124 and 126 to provide transmission of the SUSP and SUSPACK signals. A logical "0" disables the SUSP and SUSPACK pins from the circuitry of the microprocessor 12.

This aspect of the preferred embodiment ensures pin-compatibility with an existing pin structure.

Figure 6:
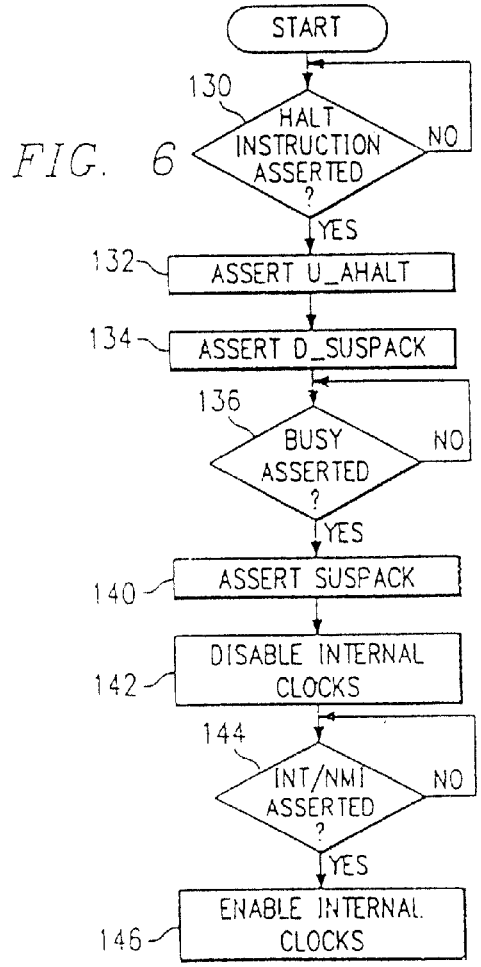
FIG. 6 illustrates a flow chart of the operation of software controlled embodiment for conserving microprocessor power consumption.

FIG. 6 illustrates another aspect of the present invention wherein the operation of the microprocessor 12 may be suspended responsive to a software command. 80×86 devices support a "HALT" operation (Opcode F4) which stops execution of all instructions and places the 80×86 in a HALT state. Execution is resumed responsive to a non-maskable interrupt (on the NMI pin) coupled to the bus controller 40, an unmasked interrupt (on the INTR pin coupled to the bus controller 40) or a RESET. Normally, this instruction is used as the last instruction in a sequence which shuts down the system.

In the present invention, however, the HALT instruction has essentially the same consequence as asserting the SUSP pin. Thus, the BIOS 16 can issue a HALT instruction to the microprocessor 12, thereby disabling CLKB. Again, disabling CLKB will result in a significant reduction of power consumed by the microprocessor 12.

FIG. 6 illustrates a flow chart showing the operation of the HALT instruction in the preferred embodiment. Once a HALT instruction to the microprocessor 12 is received in decision block 130, U_AHALT is asserted by the microcode ROM 48 in block 132. In response to the U_AHALT signal from the microcode ROM, the exception processor 86 asserts D_SUSPACK. After checking the busy signal from the coprocessor in decision block 136, the SUSPACK signal is asserted in block 140 by the bus controller 40 and the internal CLKB clock is disabled in block 142. In decision block 144, the microprocessor 12 remains in the suspended state until an interrupt is asserted in decision block 144. Once the interrupt is asserted, the CLKB clock is enabled and processing continues.

The HALT instruction allows the BIOS 16 to place the microprocessor 12 in a suspended state without any additional hardware connections to the microprocessor.

The present invention provides significant advantages over the prior art. By suspending the clocks to the core circuitry and memory circuitry, a current consumption of less than 10 milliamps has been demonstrated. Since most BIOS programs support power conservation measures, the additional coding for supporting the SUSP and SUSPACK signals is relatively simple. Alternatively, the chipset logic 18 can be modified to support the SUSP and SUSPACK signals. Further, since the SUSPACK, in the preferred embodiment, is not asserted until after coprocessor operations are completed, the BIOS does not have to provide additional circuitry or codes for monitoring the coprocessor. Further, the power saving circuitry may be provided on the microprocessor chip without sacrificing pin-compatibility. Additionally, by using the enhanced HALT command, the microprocessor may be operated in a suspended state without any hardware interaction, other than asserting an interrupt to bring the microprocessor 12 out of a suspended state.

Although the present invention and its advantages have been described in detail, it should be understood that various changes, substitutions and alterations can be made herein without departing from the spirit and scope of the invention as defined by the appended claims.

What is claimed is:

1. A method for externally controlling a processor used to execute instructions for data processing, comprising:
   providing directly to said processor a low-power-mode control signal by
      asserting said low-power-mode control signal in response to a detection of one or more conditions associated with having said processor enter a low power operational mode, and
      de-asserting said low-power-mode control signal in response to a detection of another one or more conditions associated with having said processor exit said low power operational mode; and
   receiving an acknowledgement signal from said processor subsequent to said assertion of said low-power-mode control signal.

2. The method of claim 1, further comprising detecting said one or more conditions associated with having said processor enter said low power operational mode.

3. The method of claim 2, further comprising detecting said processor entry to said low power operational mode.

4. The method of claim 2, wherein said detecting said one or more conditions associated with having said processor enter said low power operational mode comprises detecting said one or more conditions by using BIOS logic.

5. The method of claim 1, further comprising detecting said another one or more conditions associated with having said processor exit from said low power operational mode.

6. The method of claim 5, further comprising detecting said processor exit from said low power operational mode.

7. The method of claim 5, wherein said detecting said another one or more conditions associated with having said processor exit from said low power operational mode comprises detecting said another one or more conditions by using BIOS logic.

8. A method for externally controlling a processor used to execute instructions for data processing, comprising:
- providing directly to said processor a power consumption control signal by
  - asserting said power consumption control signal in response to a detection of one or more conditions associated with initiation of a power consumption reduction procedure, and
  - de-asserting said power consumption control signal in response to a detection of another one or more conditions associated with termination of said power consumption reduction procedure; and
- receiving an acknowledgement signal from said processor subsequent to said assertion of said power consumption control signal.

9. The method of claim 8, further comprising detecting said one or more conditions associated with having said processor initiate said power consumption reduction procedure.

10. The method of claim 9, further comprising detecting said initiation of said power consumption reduction procedure by said processor.

11. The method of claim 9, wherein said detecting said one or more conditions associated with having said processor initiate said power consumption reduction procedure comprises detecting said one or more conditions by using BIOS logic.

12. The method of claim 8, further comprising detecting said another one or more conditions associated with having said processor terminate said power consumption reduction procedure.

13. The method of claim 12, further comprising detecting said termination of said power consumption reduction procedure by said processor.

14. The method of claim 12, wherein said detecting said another one or more conditions associated with having said processor terminate said power consumption reduction procedure comprises detecting said another one or more conditions by using BIOS logic.

15. A method for externally controlling a processor used to execute instructions for data processing, comprising:
- providing directly to said processor a low-power-mode control signal which includes first and second values by maintaining said first value in response to a detection of one or more conditions associated with having said processor enter a low power operational mode, and maintaining said second value in response to a detection of another one or more conditions associated with having said processor exit said low power operational mode; and
- receiving an acknowledgement signal from said processor subsequent to ar attainment of said first low-power-mode control signal value.

16. The method of claim 15, further comprising detecting said one or more conditions associated with having said processor enter said low power operational mode.

17. The method of claim 16, further comprising detecting said processor entry to said low power operational mode.

18. The method of claim 16, wherein said detecting said one or more conditions associated with having said processor enter said low power operational mode comprises detecting said one or more conditions by using BIOS logic.

19. The method of claim 15, further comprising detecting said another one or more conditions associated with having said processor exit from said low power operational mode.

20. The method of claim 19, further comprising detecting said processor exit from said low power operational mode.

21. The method of claim 19, wherein said detecting said another one or more conditions associated with having said processor exit from said low power operational mode comprises detecting said another one or more conditions by using BIOS logic.

22. A method for externally controlling a processor used to execute instructions for data processing, comprising:
- providing directly to said processor a power consumption control signal which includes first and second values by maintaining said first value in response to a detection of one or more conditions associated with initiation of a power consumption reduction procedure, and maintaining said second value in response to a detection of another one or more conditions associated with termination of said power consumption reduction procedure; and
- receiving an acknowledgement signal from said processor subsequent to an attainment of said first power consumption control signal value.

23. The method of claim 22, further comprising detecting said one or more conditions associated with having said processor initiate said power consumption reduction procedure.

24. The method of claim 23, further comprising detecting said initiation of said power consumption reduction procedure by said processor.

25. The method of claim 23, wherein said detecting said one or more conditions associated with having said processor initiate said power consumption reduction procedure comprises detecting said one or more conditions by using BIOS logic.

26. The method of claim 22, further comprising detecting said another one or more conditions associated with having said processor terminate said power consumption reduction procedure.

27. The method of claim 26, further comprising detecting said termination of said power consumption reduction procedure by said processor.

28. The method of claim 27, wherein said detecting said another one or more conditions associated with having said processor terminate said power consumption reduction procedure comprises detecting said another one or more conditions by using BIOS logic.

29. A method for externally controlling a processor used to execute instructions for data processing, comprising:
- providing directly to said processor a low-power-mode control signal by
  - asserting said low-power-mode control signal in response to a detection of one or more conditions associated with having said processor enter a low power operational mode, and
  - de-asserting said low-power-mode control signal in response to a detection of another one or more conditions associated with having said processor exit said low power operational mode;
- receiving an acknowledgement signal from said processor subsequent to said assertion of said low-power-mode control signal; and
- providing to said processor a clock signal which is independent of said low-power-mode control signal.

30. The method of claim 29, further comprising detecting said one or more conditions associated with having said processor enter said low power operational mode.

31. The method of claim 30, further comprising detecting said processor entry to said low power operational mode.

32. The method of claim 30, wherein said detecting said one or more conditions associated with having said processor enter said low power operational mode comprises detecting said one or more conditions by using BIOS logic.

33. The method of claim 29, further comprising detecting said another one or more conditions associated with having said processor exit from said low power operational mode.

34. The method of claim 33, further comprising detecting said processor exit from said low power operational mode.

35. The method of claim 33, wherein said detecting said another one or more conditions associated with having said processor exit from said low power operational mode comprises detecting said another one or more conditions by using BIOS logic.

36. A method for externally controlling a processor used to execute instructions for data processing, comprising:

providing directly to said processor a power consumption control signal by
      asserting said power consumption control signal in response to a detection of one or more conditions associated with initiation of a power consumption reduction procedure, and
      de-asserting said power consumption control signal in response to a detection of another one or more conditions associated with termination of said power consumption reduction procedure;
   receiving an acknowledgement signal from said processor subsequent to said assertion of said power consumption control signal; and
   providing to said processor a clock signal which is independent of said power consumption control signal.

37. The method of claim 36, further comprising detecting said one or more conditions associated with having said processor initiate said power consumption reduction procedure.

38. The method of claim 37, further comprising detecting said initiation of said power consumption reduction procedure by said processor.

39. The method of claim 37, wherein said detecting said one or more conditions associated with having said processor initiate said power consumption reduction procedure comprises detecting said one or more conditions by using BIOS logic.

40. The method of claim 36, further comprising detecting said another one or more conditions associated with having said processor terminate said power consumption reduction procedure.

41. The method of claim 40, further comprising detecting said termination of said power consumption reduction procedure by said processor.

42. The method of claim 40, wherein said detecting said another one or more conditions associated with having said processor terminate said power consumption reduction procedure comprises detecting said another one or more conditions by using BIOS logic.

* * * * *

UNITED STATES PATENT AND TRADEMARK OFFICE
CERTIFICATE OF CORRECTION

PATENT NO.     : 6,721,894 B2
DATED          : April 13, 2004
INVENTOR(S)    : Maher et al.

It is certified that error appears in the above-identified patent and that said Letters Patent is hereby corrected as shown below:

Title page,
Item [60], Related U.S. Application Data, please correct so that it now reads:
-- Division of application No. 09/779,150, filed on February 8, 2001, now Pat. No. 6,694,443 B1, which is a division of application No. 09/570,155, filed on May 12, 2000, now Pat. No. 6,343,363, which is a continuation of application No. 08/777,772, filed on Dec. 9, 1996, now Pat. No. 6,088,807, which is a division of application No. 08/310,895, filed Sep. 22, 1994, now Pat. No. 5,630,143, which is a continuation of application No. 07/858,579, Mar. 27, 1992, abandoned. --

Column 3,
Line 67, please delete "e" after "consumption;"

Column 5,
Line 50, please delete "e" after "suspend"
Line 54, please delete "e" after "bus"

Column 9,
Line 52, please delete "ar" and replace with -- an --

Signed and Sealed this

Eighth Day of June, 2004

JON W. DUDAS
*Acting Director of the United States Patent and Trademark Office*